United States Patent
Jung et al.

(10) Patent No.: US 8,463,201 B2
(45) Date of Patent: Jun. 11, 2013

(54) APPARATUS AND METHOD FOR REMOVING TRANSMISSION LEAKAGE SIGNAL

(75) Inventors: Sung-chan Jung, Changwon (KR); Youngoo Yang, Suwon (KR); Min-su Kim, Suwon (KR)

(73) Assignees: Samsung Techwin Co., Ltd., Changwon (KR); Sungkyunkwan University Foundation for Corporate, Suwon (KR)

( * ) Notice: Subject to any disclaimer, the term of this patent is extended or adjusted under 35 U.S.C. 154(b) by 204 days.

(21) Appl. No.: 13/151,815

(22) Filed: Jun. 2, 2011

(65) Prior Publication Data
US 2011/0300817 A1   Dec. 8, 2011

(30) Foreign Application Priority Data
Jun. 3, 2010 (KR) .......................... 10-2010-0052362

(51) Int. Cl.
*H04B 1/04* (2006.01)

(52) U.S. Cl.
USPC .......................... 455/78; 455/114.2; 455/126

(58) Field of Classification Search
CPC .......................................................... H04B 1/44
USPC .................. 455/67.11, 67.14, 73, 78, 80, 82, 455/83, 91, 102, 114.1, 114.2, 115.1, 126, 455/128
See application file for complete search history.

(56) References Cited

U.S. PATENT DOCUMENTS

| 8,086,191 B2 * | 12/2011 | Fukuda et al. | 455/114.2 |
| 2009/0068957 A1 * | 3/2009 | Koo et al. | 455/67.14 |
| 2011/0136445 A1 * | 6/2011 | Lee et al. | 455/78 |

* cited by examiner

Primary Examiner — Thanh Le
(74) Attorney, Agent, or Firm — Sughrue Mion, PLLC

(57) ABSTRACT

An apparatus and method for removing a transmission leakage signal from a radio frequency identification (RFID) reader are provided. The apparatus includes a removing unit having a device of a large impedance and a phase shifter capable of a wide range phase change with respect to a leakage signal, thereby optimally removing the transmission leakage signal irrespective of a change in the frequency characteristics and a change in the length of a cable.

19 Claims, 7 Drawing Sheets

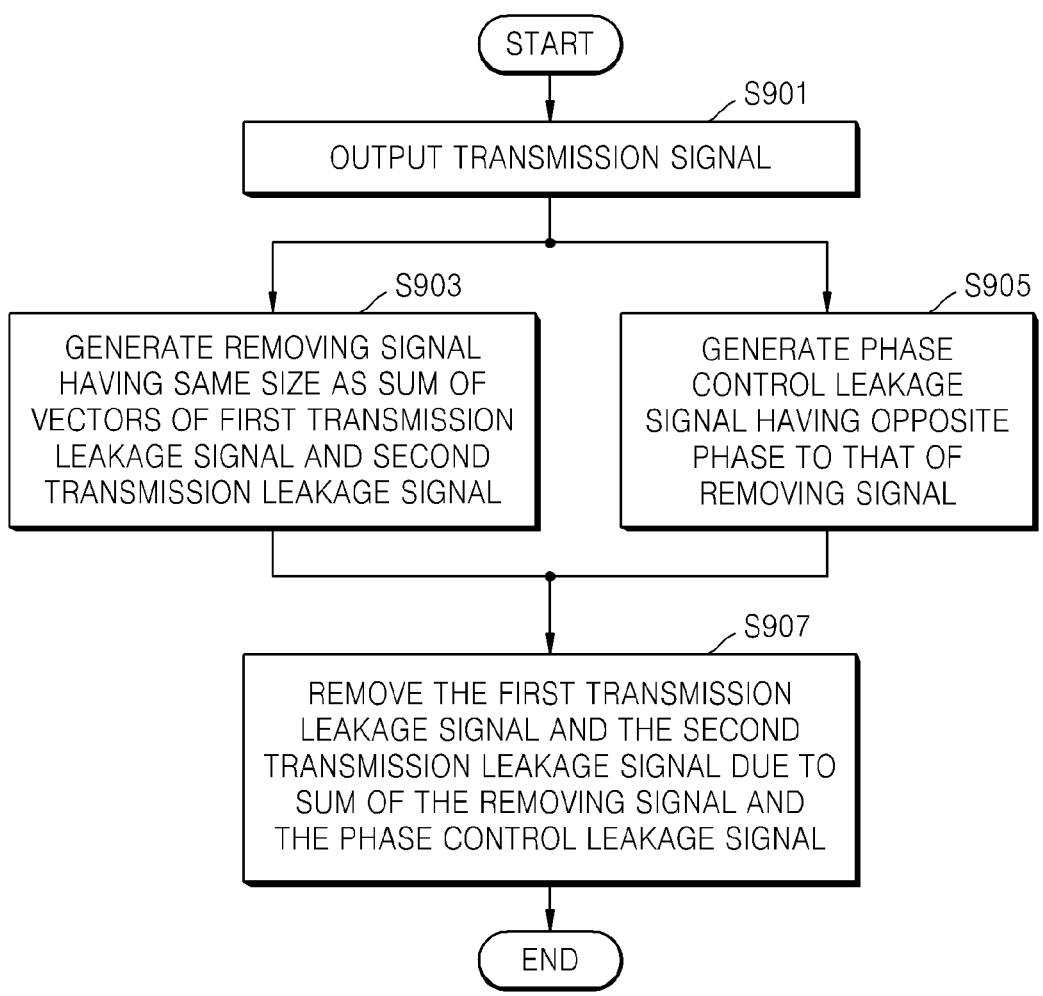

APPARATUS AND METHOD FOR REMOVING TRANSMISSION LEAKAGE SIGNAL

CROSS-REFERENCE TO RELATED PATENT APPLICATION

This application claims priority from Korean Patent Application No. 10-2010-0052362, filed on Jun. 3, 2010, in the Korean Intellectual Property Office, the disclosure of which is incorporated herein in its entirety by reference.

BACKGROUND

1. Field

Apparatuses and methods consistent with exemplary embodiments relate to an apparatus for removing a transmission leakage signal from a radio frequency identification (RFID) reader.

2. Description of the Related Art

RFID is a wireless recognition technology for acquiring information regarding an object to be identified through communication between a tag attached to the object and a reader, and is a base for a next-generation ubiquitous sensor network (USN).

An RFID system includes a tag storing information regarding an object and a reader acquiring the information, and uses the same frequency, unlike other wireless communication systems which use different transmission/reception frequencies. Thus, separation between transmission and reception signal ports is important to the RFID system. Insufficient separation of a transmission signal and a reception signal deteriorates identification perception of the reader.

Antennas are conventionally separated in order to improve separation between transmission and reception signals. However, if a plurality of antennas are used to separate the two signals, a space where the antennas are installed, the size of a transceiver, and manufacturing costs are increased.

In order to address this problem, one antenna is used for both transmitting and receiving signals, together with a circulator or a directional coupler that separates transmission signals from reception signals. However, the circulator or the directional coupler is not an ideal device, and use of such device may cause a leakage of a transmission signal when the transmission signal enters a receiving path.

SUMMARY

One or more exemplary embodiments provide an apparatus and method for easily removing a transmission leakage signal from an RFID reader in all of frequency bands used by an RFID system.

According to an aspect of an exemplary embodiment, there is provided an apparatus for removing a transmission leakage signal, the apparatus including: a signal separation unit which outputs a first transmission leakage signal leaked from a transmission signal and a second transmission leakage signal generated from reflection of the transmission signal at an antenna; a removing unit which generates a removing signal having a given value in reference to at least one of a value of the first transmission leakage signal and a value of the second transmission leakage signal by using the transmission signal; and a phase shifter which generates a phase control leakage signal having a phase different from a phase of the removing signal by adjusting at least one of a phase of the first transmission leakage signal and a phase of the second transmission leakage signal.

The signal separation unit may be a circulator or a directional coupler.

The removing unit may be disposed at an input end or an output end of the signal separation unit. The removing unit may include a resistor, an inductor, and a capacitor, and a time delay element each comprising a lumped element or a distributed element. Values of the resistor and the capacitor may be variable. The resistor, the inductor, the capacitor, and the time delay element have a series, parallel or a series/parallel combination structure, and positions of the resistor, the inductor, the capacitor, and the time delay element are variable, and the resistor, the inductor, the capacitor, and the time delay element may be disposed at multiple stages.

The phase shifter may be a passive device or an active device, or a series, parallel, or multiple stage combination thereof The apparatus may further include a control unit which detects at least one of the removing signal and the phase control leakage signal, and generates a control signal to adjust at least one of the given value of the removing signal and the phase of the phase control leakage signal.

The control unit may generate the control signal based on at least one of control algorithm and a look-up table (LUT).

According to an aspect of another exemplary embodiment, there is provided a method of removing a transmission leakage signal, the method including: generating a removing signal having a same size as a sum of a first transmission leakage signal leaked from a transmission signal and a second transmission leakage signal generated from reflection of the transmission signal at an antenna; and generating a phase control leakage signal having a phase different from a phase of the removing signal by adjusting at least one of a phase of the first transmission leakage signal and a phase of the second transmission leakage signal, or by adjusting a phase of a sum of the first transmission leakage signal and the second transmission leakage signal.

BRIEF DESCRIPTION OF THE DRAWINGS

The above and other aspects of become more apparent by describing in detail exemplary embodiments with reference to the attached drawings, in which:

FIG. 9 is a flowchart of a method of removing a transmission leakage signal, according to an exemplary embodiment.

DETAILED DESCRIPTION OF EXEMPLARY EMBODIMENTS

Hereinafter, exemplary embodiments will be described in detail with reference to the attached drawings.

Figure 1:
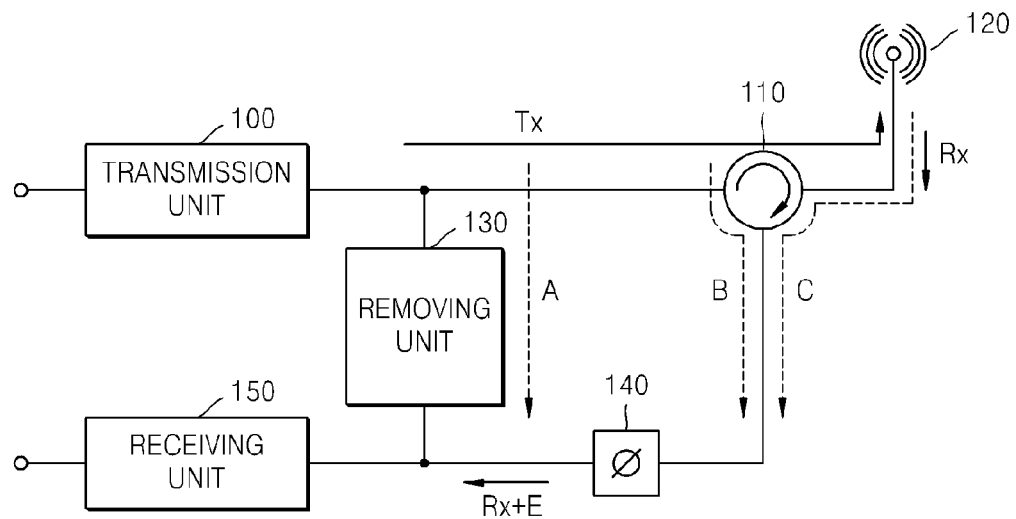
FIG. 1 illustrates a structure of an apparatus for removing a transmission leakage signal, according to an exemplary embodiment.

FIG. 1 illustrates a structure of an apparatus for removing a transmission leakage signal, according to an exemplary embodiment. Referring to FIG. 1, the apparatus for removing the transmission leakage signal of the present exemplary embodiment includes a transmission unit 100, a circulator 110, an antenna 120, a removing unit 130, a phase shifter 140, and a receiving unit 150.

The transmission unit 100 outputs a continuous wave (CW) signal used to operate a tag and a modulation signal used to transfer information as a transmission signal Tx. The tag receives the transmission signal Tx, uses a part of the CW signal as driving power thereof, and reflects a part thereof to a reader to perform communication.

The circulator 110 is a signal separation device that receives the transmission signal Tx from the transmission unit 100, transmits the transmission signal Tx to the antenna 120, receives an information signal Rx of the tag received from the antenna 120, and transmits the information signal Rx to the receiving unit 150. The circulator 110 outputs to the phase shifter 140 a first transmission leakage signal B that is a part of the transmission signal Tx leaked from the transmission signal Tx, and a second transmission leakage signal C that is generated as a reflection signal because the transmission signal Tx is not entirely transmitted through the antenna 120 due to impedance mismatch between the circulator 110 and the antenna 120. The information signal Rx from the tag, together with the first transmission leakage signal B and the second transmission leakage signal C, is output to the phase shifter 140.

The removing unit 130 is disposed between an output end of the transmitting unit 100 and an input end of the circulator 110. The removing unit 130 leaks a part of the transmission signal Tx transmitted toward the circulator 110, as a removing signal A, and outputs the removing signal A to the receiving unit 150. The removing signal A has a component of the same size as a sum of vectors of the first transmission leakage signal B and the second transmission leakage signal C.

The removing unit 130 comprises a combination of at least one of a resistor, a capacitor, an inductor, and a time delay element. The resistor may include a variable resistor, and have an electrically variable structure such as a PIN diode which that uses analog and digital signals. The capacitor may be variable, and may include an electrically variable structure such as a varactor diode that uses analog and digital signals. In this regard, a combination of the at least one of the resistor, the capacitor, the inductor, and the time delay element may be a lumped element or a distributed element. The at least one of the resistor, the capacitor, the inductor, and the time delay element may have series, parallel, or series/parallel combination structure. Positions of the resistor, the capacitor, the inductor, and the time delay element are variable and disposed at multiple stages.

The removing unit 130 can use a resistor having very large impedance since the removing unit 130 functions to adjust the size of a signal, and thus, exhibiting good performance in the band characteristics affecting a transmission signal.

The leakage characteristics of the circulator 110 and the reflection characteristics of the antenna 120 may vary in a frequency band of about 120 MHz, for example, between 840 MHz and 960 MHz, used in an RFID system. Thus, the removing unit 130 needs to adjust the at least one of the resistor, the capacitor, the inductor, and the time delay element in order to effectively remove the first transmission leakage signal B and the second transmission leakage signal C. However, it is difficult to control both a change in the reflection characteristics of the antenna 120 with respect to frequencies and a phase change due to a length of a cable connecting a reader and the antenna 120 by using the combination of the at least one of the resistor, the capacitor, the inductor, and the time delay element. Thus, the phase shifter 140 is disposed at a front end of the receiving unit 150.

The phase shifter 140 is disposed between a separation end of the circulator 110 and an input end of the receiving unit 150. The phase shifter 140 generates a phase control leakage signal E having a phase difference of 180° from a phase of the removing signal A by adjusting phases of the first transmission leakage signal B and the second transmission leakage signal C (or a phase of the sum of the transmission leakage signals B and C), and outputs the phase control leakage signal E to the receiving unit 150. The phase shifter 140 outputs a signal obtained by adding the information signal Rx and the phase control leakage signal E to the receiving unit 150. The phase shifter 140 may include a passive device or an active device, or a series, parallel, or multiple stage combination thereof. However, the inventive concept is not limited thereto, and the phase shifter 140 may have all structures for adjusting a phase. The phase shifter 140 changes the phases of the first transmission leakage signal B and the second transmission leakage signal C between 0° and 360°, irrespective of sizes of the first transmission leakage signal B and the second transmission leakage signal C, and the band characteristics thereof are determined according to an operating bandwidth thereof, and thus, the inventive concept may be applied to a broad bandwidth.

The receiving unit 150 receives the information signal Rx from which the first and second transmission leakage signals B and C are removed due to the sum of the removing signal A and the phase control leakage signal E. Owing to the removal of the first and second transmission leakage signals B and C, the reception sensitivity of the receiving unit 150 is improved, thereby improving tag identification capability, a tag identification speed, and a tag identification distance of the tag.

Figure 2:
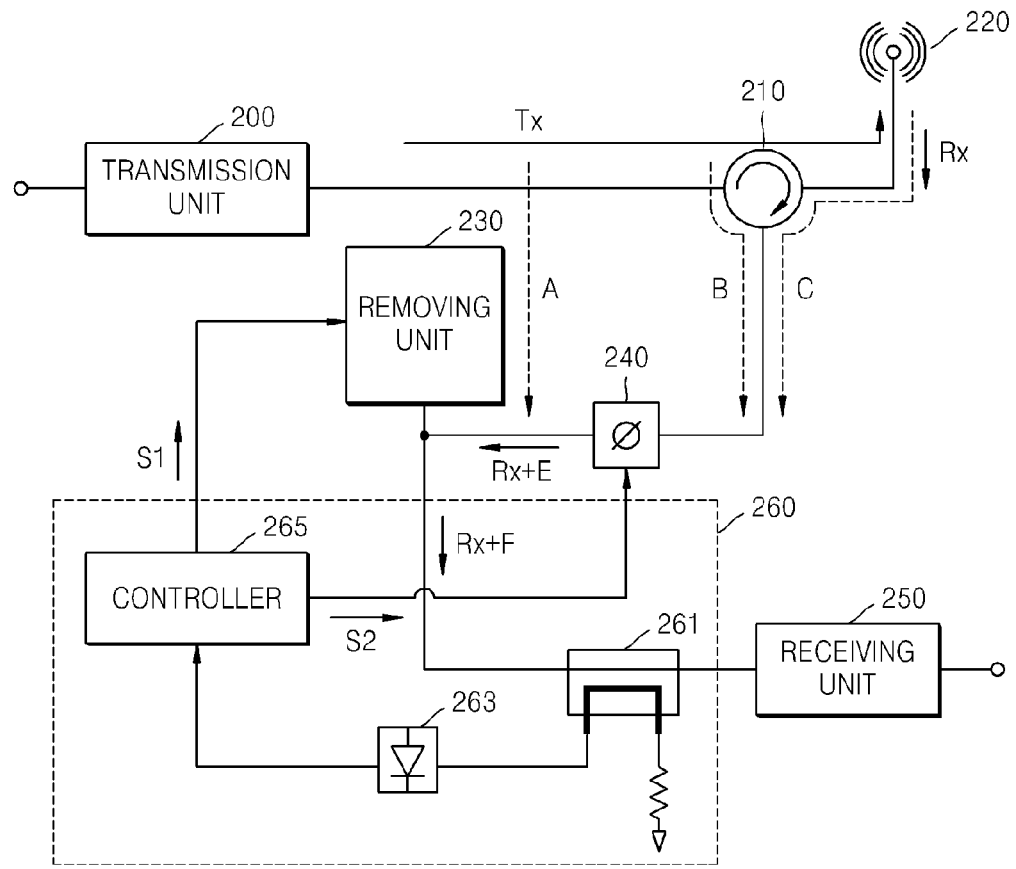
FIG. 2 illustrates a structure of an apparatus for removing a transmission leakage signal, according to another exemplary embodiment.

FIG. 2 illustrates a structure of an apparatus for removing a transmission leakage signal, according to another exemplary embodiment.

Referring to FIG. 2, the apparatus for removing the transmission leakage signal includes a transmission unit 200, a circulator 210, an antenna 220, a removing unit 230, a phase shifter 240, a receiving unit 250, and a control unit 260.

The apparatus for removing the transmission leakage signal of FIG. 2 is different from the apparatus for removing the transmission leakage signal of FIG. 1 in that the control unit 260 is additionally disposed at a front end of the receiving unit 250, and the other constituents thereof are the same as described with reference to FIG. 1, and thus, detailed descriptions thereof will not be repeated here.

The transmission unit 200 outputs the transmission signal Tx to the circulator 210. The circulator 210 transmits the transmission signal Tx to the antenna 220. The antenna 220 outputs the transmission signal Tx. In this regard, the transmission signal Tx is leaked in the circulator 210 and the antenna 220, and is introduced into the circulator 210 as the first transmission leakage signal B and the second transmission leakage signal C. The circulator 210 receives the information signal Rx of a tag from the antenna 220. The information signal Rx and the sum of the first transmission leakage signal B and the second transmission leakage signal C are output to the phase shifter 240.

Meanwhile, the removing unit 230 leaks a part of the transmission signal Tx input from the transmission unit 200 to the circulator 210 to generate the removing signal A having an adjusted size. The removing signal A has the same size as a sum of vectors of the first transmission leakage signal B and the second transmission leakage signal C.

The phase shifter 240 generates the phase control leakage signal E by varying the phases of the transmission leakage signals B and C. The phase control leakage signal E has a phase difference of 180° from the phase of the removing signal A.

A transmission leakage signal F obtained by adding the removing signal A and the phase control leakage signal E, together with the information signal Rx, is input into the control unit 260.

The control unit 260 includes a directional coupler 261, a leakage signal detector 263, and a controller 265. The directional coupler 261 receives the transmission leakage signal F and the information signal Rx. The leakage signal detector 263 detects power of the transmission leakage signal F, and outputs a detection result to the controller 265. The leakage signal detector 263 may include a use detection chip, and a device such as a Schottky diode or a transistor. The controller 265 outputs control signals S1 and S2 to the removing unit 230 and the phase shifter 240, respectively, in such a way that voltage or power of the transmission leakage signal F is minimized, e.g., close to 0. The controller 265 may generate and output the control signals S1 and S2, respectively, in real time by using control algorithm, or by using a look-up table (LUT) in which control values for predetermined power are stored. The controller 265 may also use both the control algorithm and the LUT.

The control unit 260 outputs the control signals S1 and S2 to the removing unit 230 and the phase shifter 240, respectively, in such a way that leakage power detected by the leakage signal detector 263 is minimized.

The removing unit 230 and the phase shifter 240 vary the size of the removing signal A and the phase of the phase control leakage signal E based on the control signals S1 and S2.

Therefore, an RFID system including the apparatus for removing the transmission leakage signal according to the above exemplary embodiments may be able to remove or weaken the transmission leakage signal, which improves the reception sensitivity of the receiving unit 250, thereby improving identification capability, an identification speed, and an identification distance of the tag. The apparatus for removing the transmission leakage signals can stably remove the transmission leakage signal with respect to an environmental change like a temperature, an operating frequency band, etc.

Figure 3:
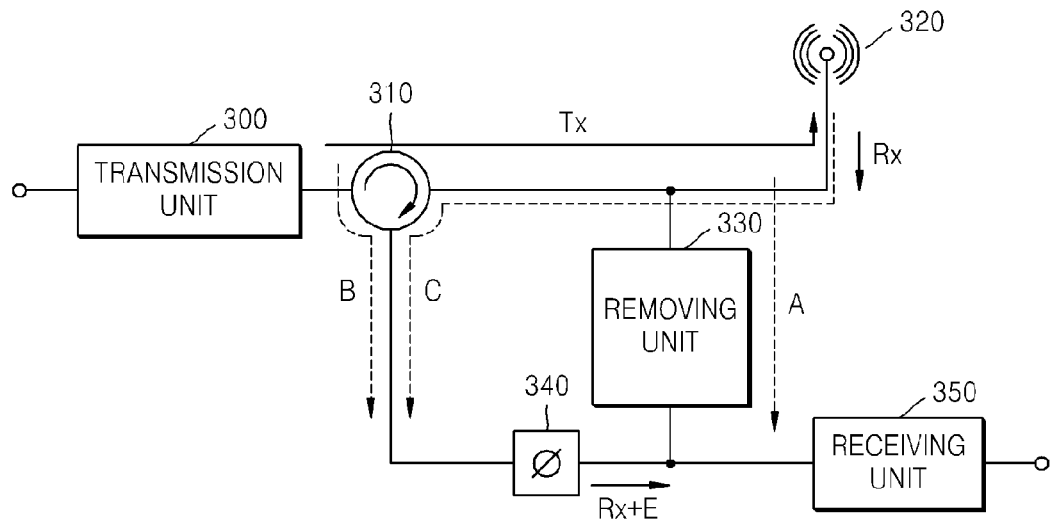
FIG. 3 illustrates a structure of an apparatus for removing a transmission leakage signal, according to another exemplary embodiment.

FIG. 3 illustrates a structure of an apparatus for removing a transmission leakage signal, according to another exemplary embodiment.

Referring to FIG. 3, the apparatus for removing the transmission leakage signal includes a transmission unit 300, a circulator 310, an antenna 320, a removing unit 330, a phase shifter 340, and a receiving unit 350.

The apparatus for removing the transmission leakage signal of FIG. 3 is different from the apparatus for removing the transmission leakage signal of FIG. 1 in that the removing unit 330 is disposed between an output end of the circulator 310 and the antenna 320, and the other constituents thereof are the same as described with reference to FIG. 1, and thus, detailed descriptions thereof will not be repeated here.

Figure 4:
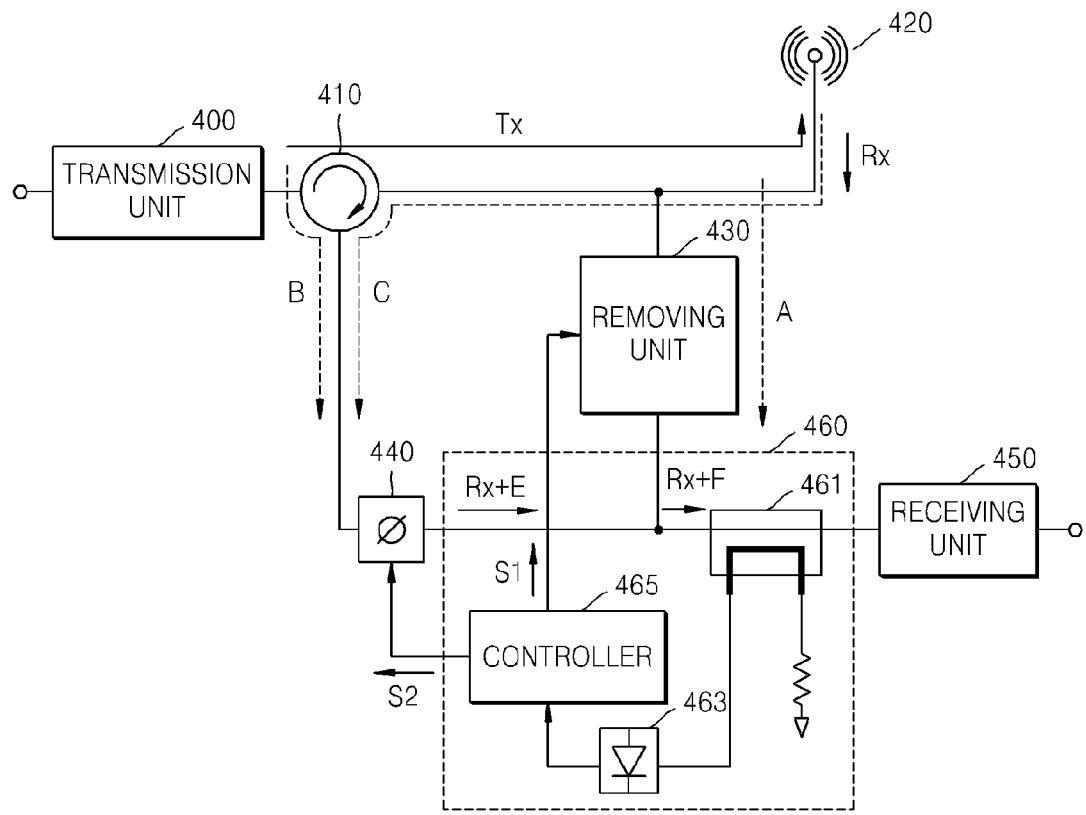
FIG. 4 illustrates a structure of an apparatus for removing a transmission leakage signal, according to another exemplary embodiment.

FIG. 4 illustrates a structure of an apparatus for removing a transmission leakage signal, according to another exemplary embodiment.

Referring to FIG. 4, the apparatus for removing the transmission leakage signal includes a transmission unit 400, a circulator 410, an antenna 420, a removing unit 430, a phase shifter 440, a receiving unit 450, and a control unit 460 (including a directional coupler 461, a leakage signal detector 463 and a controller 465).

The apparatus for removing the transmission leakage signal of FIG. 4 is different from the apparatus for removing the transmission leakage signal of FIG. 1 in that the removing unit 430 is disposed between an output end of the circulator 410 and the antenna 420, and the control unit 460 is additionally disposed at a front end of the receiving unit 450, and the other constituents thereof are the same as described with reference to FIG. 1, and thus, detailed descriptions thereof will not be repeated here.

Figure 5:
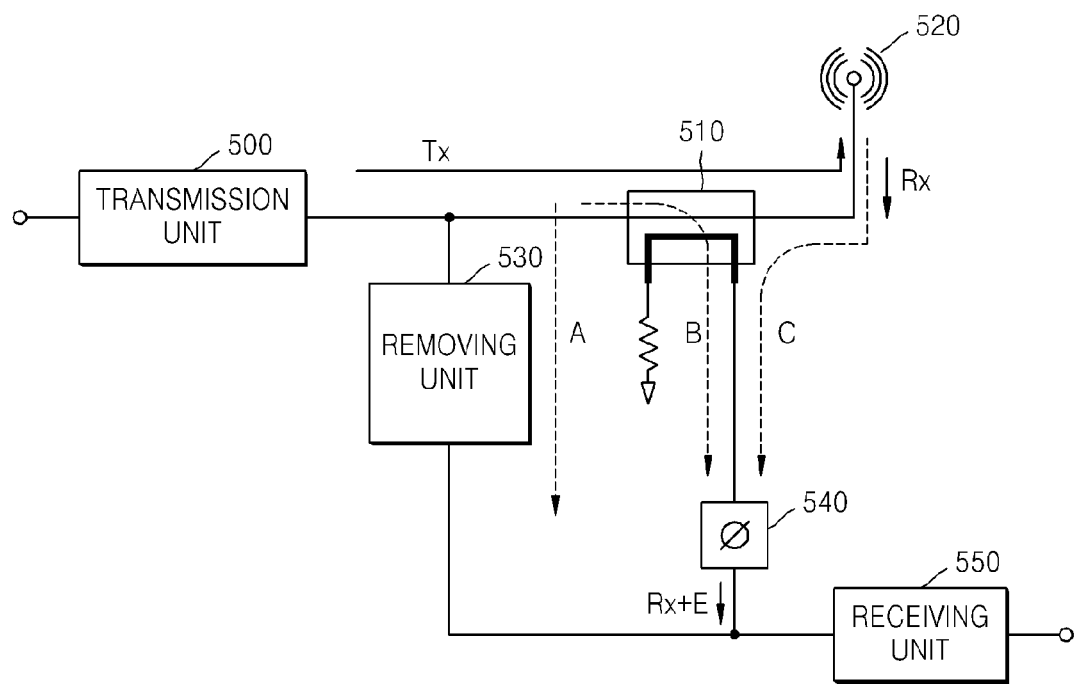
FIG. 5 illustrates a structure of an apparatus for removing a transmission leakage signal, according to another exemplary embodiment.

FIG. 5 illustrates a structure of an apparatus for removing a transmission leakage signal, according to another embodiment of the present invention.

Referring to FIG. 5, the apparatus for removing the transmission leakage signal includes a transmission unit 500, a directional coupler 510, an antenna 520, a removing unit 530, a phase shifter 540, and a receiving unit 550.

The apparatus for removing the transmission leakage signal of FIG. 5 is different from the apparatus for removing the transmission leakage signal of FIG. 1 in that the directional coupler 510, other than the circulator 110, is included as a signal separation device, and the other constituents thereof are the same as described with reference to FIG. 1, and thus, detailed descriptions thereof will not be repeated here.

The directional coupler 510 has a high separation degree at a broad operating frequency band and is inexpensive, compared to a circulator that is optimized to a specific frequency band.

The transmission unit 500 outputs the transmission signal Tx to the directional coupler 510. The directional coupler 510 transmits the transmission signal Tx to the antenna 520. The antenna 520 outputs the transmission signal Tx. In this regard, the transmission signal Tx is leaked in the directional coupler 510 and the antenna 520, and is introduced into the directional coupler 510 as the first transmission leakage signal B and the second transmission leakage signal C, respectively. The directional coupler 510 receives the information signal Rx of a tag from the antenna 520. The information signal Rx, together with the sum of the first transmission leakage signal B and the second transmission leakage signal C, is output to the phase shifter 540.

Meanwhile, the removing unit 530 is disposed between an output end of the transmission unit 500 and an input end of the directional coupler 510, leaks a part of the transmission signal Tx input from the transmission unit 500 to the directional coupler 510, and generates the removing signal A having an adjusted size. The removing signal A has the same size as a sum of vectors of the first transmission leakage signal B and the second transmission leakage signal C.

The phase shifter 540 is disposed between a separation end of the directional coupler 510 and an input end of the receiving unit 550, and generates the phase control leakage signal E by varying the phases of the transmission leakage signals B and C (or the phase of the sum of the transmission leakage signals B and C). The phase control leakage signal E has a phase difference of 180° from the phase of the removing signal A.

The transmission leakage signal F, that is the sum of the removing signal A and the phase control leakage signal E, is removed from the input end of the receiving unit 550. The information signal Rx is input into the receiving unit 550.

The removal of the transmission leakage signals B and C improves the reception sensitivity of the receiving unit 550, thereby improving tag identification capability, a tag identification speed, and a tag identification distance.

Figure 6:
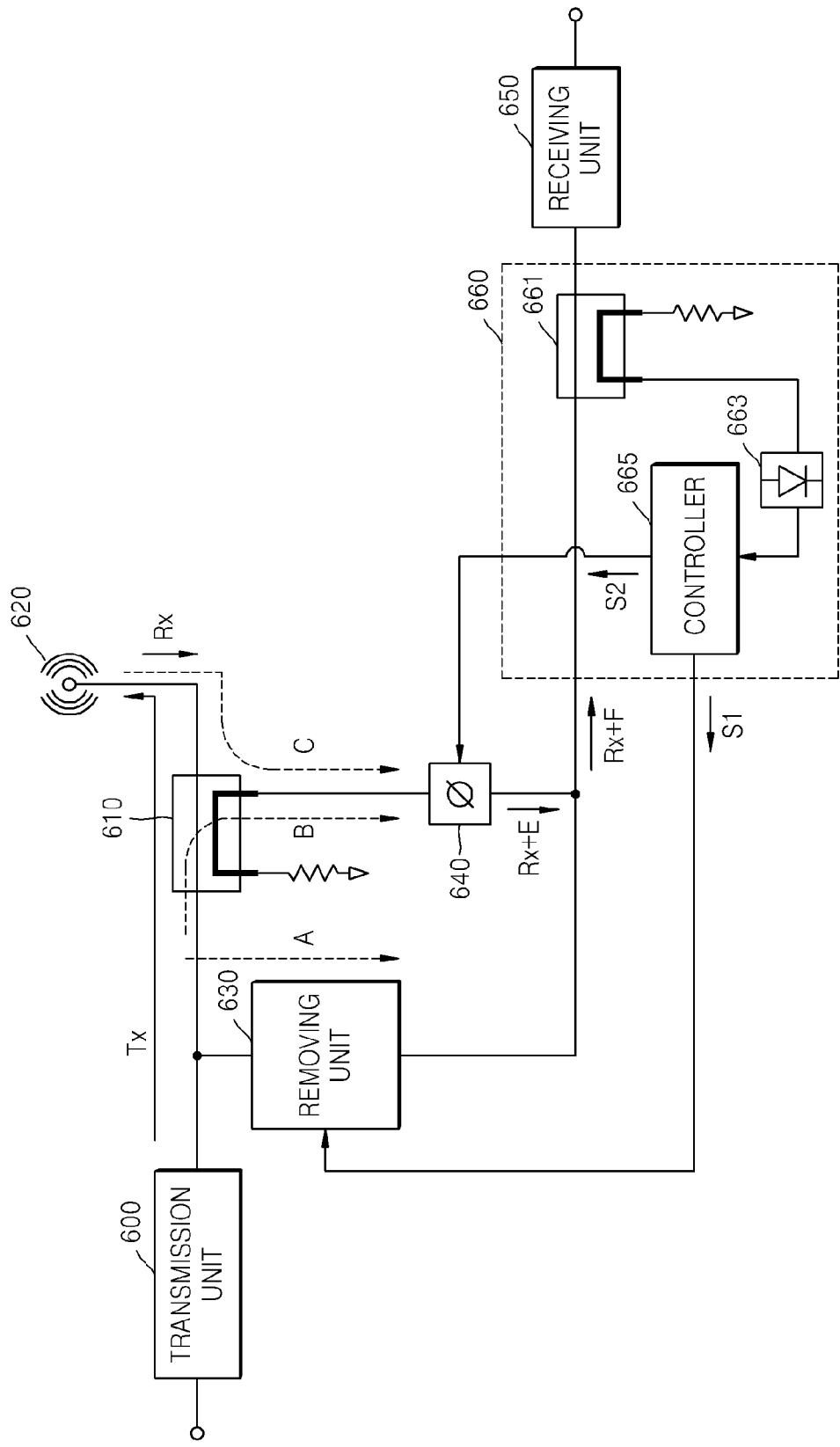
FIG. 6 illustrates a structure of an apparatus for removing a transmission leakage signal, according to another exemplary embodiment.

FIG. 6 illustrates a structure of an apparatus for removing a transmission leakage signal, according to another exemplary embodiment.

Referring to FIG. 6, the apparatus for removing the transmission leakage signal includes a transmission unit 600, a first directional coupler 610, an antenna 620, a removing unit 630, a phase shifter 640, a receiving unit 650, and a control unit 660.

The apparatus for removal the transmission leakage signal of FIG. 6 is different from the apparatus for removing the transmission leakage signal of FIG. 5 in that the control unit 660 is additionally disposed at a front end of the receiving unit 650, and the other constituents thereof are the same as described with reference to FIG. 5, and thus detailed descriptions thereof will not be repeated here.

The transmission unit 600 outputs the transmission signal Tx to the first directional coupler 610. The first directional coupler 610 transmits the transmission signal Tx to the antenna 620. The antenna 620 outputs the transmission signal Tx. In this regard, the transmission signal Tx is leaked in the first directional coupler 610 and the antenna 620, and is introduced into the first directional coupler 610 as the first transmission leakage signal B and the second transmission leakage signal C, respectively. The first directional coupler 610 receives the information signal Rx of a tag from the antenna 620. The information signal Rx, together with the sum of the first transmission leakage signal B and the second transmission leakage signal C, is output to the phase shifter 640.

Meanwhile, the removing unit 630 leaks a part of the transmission signal Tx input from the transmission unit 600 to the first directional coupler 610, and generates the removing signal A having an adjusted size. The removing signal A has the same size as a sum of vectors of the first transmission leakage signal B and the second transmission leakage signal C.

The phase shifter 640 generates the phase control leakage signal E by varying the phases of the transmission leakage signals B and C (or the phase of the sum of the transmission leakage signals B and C). The phase control leakage signal E has a phase difference of 180° from the phase of the removing signal A.

The transmission leakage signal F, that is the sum of the removing signal A and the phase control leakage signal E, together with the information signal Rx, is input into the control unit 660.

The control unit 660 includes another directional coupler 661, a leakage signal detector 663, and a controller 665. The other directional coupler 661 receives the transmission leakage signal F and the information signal Rx. The leakage signal detector 663 detects power of the transmission leakage signal F, and outputs a detection result to the controller 665. The leakage signal detector 663 may include a use detection chip, and a device such as a Schottky diode or a transistor. The controller 665 outputs control signals S1 and S2 to the removing unit 630 and the phase shifter 640, respectively, in such a way that voltage or power of the transmission leakage signal F is minimized, e.g., close to 0. The controller 665 may generate and output the control signals S1 and S2 in real time by using control algorithm, or by using a LUT in which control values for predetermined power are stored. The controller 665 may also use both the control algorithm and the LUT.

The control unit 660 outputs the control signals S1 and S2 to the removing unit 630 and the phase shifter 640, respectively, in such a way that leakage power detected by the leakage signal detector 663 is minimized.

The removing unit 630 and the phase shifter 640 vary the size of the removing signal A and the phase of the phase control leakage signal E based on the control signals S1 and S2.

Therefore, an RFID system including the apparatus for removing the transmission leakage signal according to the present exemplary embodiment may be able to remove or weaken the transmission leakage signals, which improves the reception sensitivity of the receiving unit 650, thereby improving tag identification capability, a tag identification speed, and a tag identification distance. The apparatus for removing the transmission leakage signal can stably remove the transmission leakage signal with respect to an environmental change like a temperature, an operating frequency band, etc.

Figure 7:
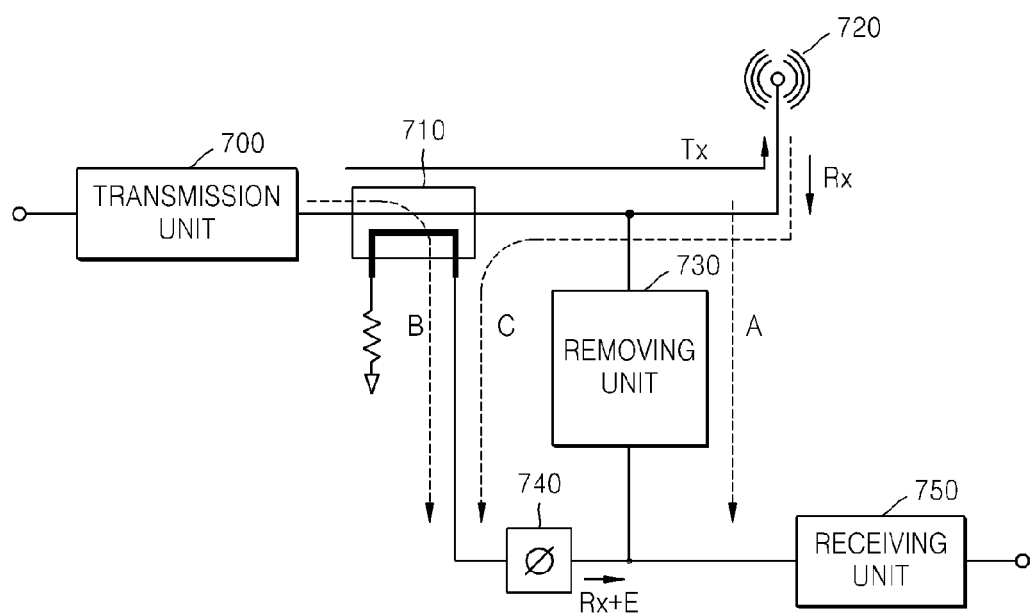
FIG. 7 illustrates a structure of an apparatus for removing a transmission leakage signal, according to another exemplary embodiment.

FIG. 7 illustrates a structure of an apparatus for removing a transmission leakage signal, according to another exemplary embodiment.

Referring to FIG. 7, the apparatus for removing the transmission leakage signal includes a transmission unit 700, a directional coupler 710, an antenna 720, a removing unit 730, a phase shifter 740, and a receiving unit 750.

The apparatus for removing the transmission leakage signal of FIG. 7 is different from the apparatus for removing the transmission leakage signal of FIG. 5 in that the removing unit 730 is disposed between an output end of the directional coupler 710 and the antenna 720, and the other constituents thereof are the same as described with reference to FIG. 5, and thus, detailed descriptions thereof will not be repeated here.

Figure 8:
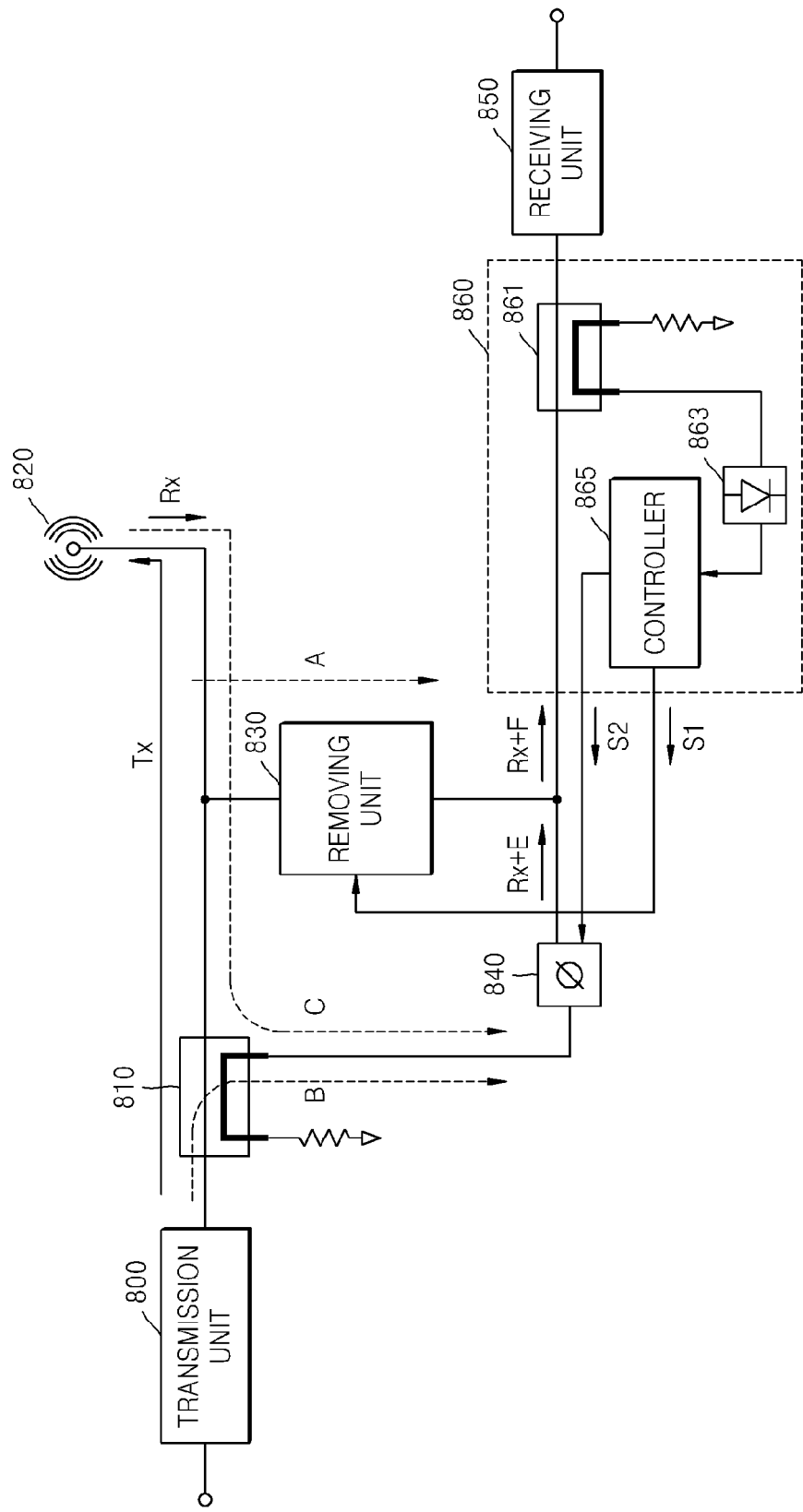
FIG. 8 illustrates a structure of an apparatus for removing a transmission leakage signal, according to another exemplary embodiment.

FIG. 8 illustrates a structure of an apparatus for removing a transmission leakage signal, according to another exemplary embodiment.

Referring to FIG. 8, the apparatus for removing the transmission leakage signal includes a transmission unit 800, a directional coupler 810, an antenna 820, a removing unit 830, a phase shifter 840, a receiving unit 850, and a control unit 860 (including another directional coupler 861, a leakage signal detector 863 and a controller 865).

The apparatus for removing the transmission leakage signal of FIG. 8 is different from the apparatus for removing the transmission leakage signal of FIG. 5 in that the removing unit 830 is disposed between an output end of the directional coupler 810 and the antenna 820, and the control unit 860 is additionally disposed at a front end of the receiving unit 850, and the other constituents thereof are the same as described with reference to FIG. 5, and thus detailed descriptions thereof will not be repeated here.

FIG. 9 is a flowchart of a method of removing a transmission leakage signal, according to an exemplary embodiment.

Referring to FIG. 9, a transmission signal is output from a transmission unit (S901). The transmission signal is transmitted to an antenna through a signal separation unit. The signal separation unit may be a circulator or a directional coupler. In this regard, a first transmission leakage signal leaked from the transmission signal and a second transmission leakage signal that is generated as a reflection signal because the transmission signal is not entirely transmitted through the antenna are applied to the signal separation unit.

A removing signal is generated from the transmission signal, for example, by leaking a part of the transmission signal (S903). The removing signal has the same size as the sum of vectors of the first transmission leakage signal and the second transmission leakage signal.

A phase control leakage signal is generated by controlling phases of the first transmission leakage signal and the second transmission leakage signal (S905). The phase control leakage signal has a phase difference of 180° from a phase of the removing signal.

The above two operations (S903 and S905) may be simultaneously or sequentially performed.

The first transmission leakage signal and the second transmission leakage signal are removed due to the sum of the removing signal and the phase control leakage signal (S907). Thus, the signal sensitivity of a receiving unit is improved by removing the phase control leakage signal corresponding to noise. The size of the removing signal and a phase of the phase control leakage signal are adjusted according to controls signals generated by a control signal based on power detection of the phase control leakage signal. Thus, the phase control leakage signal can be optimally removed.

A removing unit configured as a device having high impedance and a phase shifter capable of a phase change in a wide range with respect to a leakage signal, thereby optimally removing the leakage signal irrespective of a change in the frequency characteristics and a change in the length of a cable. Therefore, a signal separation device such as a circulator having a specific frequency can be used in all frequency bands of an RFID system, thereby overcoming restrictions of the signal separation device when applied to the RFID system and all systems similar to the RFID system.

As described above, the size of a transmission leakage signal applied to a receiving unit of an RFID reader is minimized, which improves reception sensitivity of the receiving unit, thereby improving tag identification capability, a tag identification speed, and a tag identification distance.

Further, the transmission leakage signal from all of frequency bands used by a RFID system is removed, thereby reducing loss of transmission and reception signals, simplifying a circuit, and reducing the size of a device.

While the exemplary embodiments have been particularly shown and described, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. An apparatus for removing a transmission leakage signal, the apparatus comprising:
a signal separation unit which outputs a first transmission leakage signal leaked from a transmission signal and a second transmission leakage signal generated from reflection of the transmission signal at an antenna;
a removing unit which generates a removing signal having a given value in reference to at least one of a value of the first transmission leakage signal and a value of the second transmission leakage signal by using the transmission signal; and
a phase shifter which generates a phase control leakage signal having a phase different from a phase of the removing signal by adjusting at least one of a phase of the first transmission leakage signal and a phase of the second transmission leakage signal.

2. The apparatus of claim 1, wherein the signal separation unit is a circulator.

3. The apparatus of claim 1, wherein the signal separation unit is a directional coupler.

4. The apparatus of claim 1, wherein the removing unit is disposed at an input end of the signal separation unit.

5. The apparatus of claim 4, wherein the removing signal is generated from the transmission signal which is transmitted from a transmission unit to the signal separation unit.

6. The apparatus of claim 1, wherein the removing unit is disposed at an output end of the signal separation unit.

7. The apparatus of claim 4, wherein the removing signal is generated from the transmission signal which is transmitted from the separation unit to the antenna.

8. The apparatus of claim 1, further comprising a control unit which detects at least one of the removing signal and the phase control leakage signal, and generates a control signal to adjust at least one of the given value of the removing signal and the phase of the phase control leakage signal.

9. The apparatus of claim 8, wherein the control unit generates the control signal based on at least one of control algorithm and a look-up table (LUT).

10. The apparatus of claim 8, wherein the given value and the values of the first transmission leakage signal and the second transmission leakage signal are vector values.

11. The apparatus of claim 8, the control unit detects both the removing signal and the phase control leakage signal, and generates a control signal to adjust both the given value of the removing signal and the phase of the phase control leakage signal.

12. The apparatus of claim 8, wherein the given value is the same as the at least one of the value of the first transmission leakage signal and the value of the second transmission leakage signal, and
wherein the phase shifter generates the phase control leakage signal having a phase opposite to the phase of the removing signal by adjusting at least one of the phase of the first transmission leakage signal and the phase of the second transmission leakage signal or by adjusting a phase of a sum of the first transmission leakage signal and the second transmission leakage signal.

13. The apparatus of claim 1, wherein the given value and the values of the first transmission leakage signal and the second transmission leakage signal are vector values.

14. The apparatus of claim 1, wherein the given value is the same as the at least one of the value of the first transmission leakage signal and the value of the second transmission leakage signal.

15. The apparatus of claim 1, wherein the given value is the same as a sum of the value of the first transmission leakage signal and the value of the second transmission leakage signal.

16. The apparatus of claim 1, wherein the phase of the phase control leakage signal is opposite to the phase of the removing signal.

17. The apparatus of claim 1, wherein the given value is the same as the at least one of the value of the first transmission leakage signal and the value of the second transmission leakage signal, and
wherein the phase shifter generates the phase control leakage signal having a phase opposite to the phase of the removing signal by adjusting at least one of the phase of the first transmission leakage signal and the phase of the second transmission leakage signal or by adjusting a phase of a sum of the first transmission leakage signal and the second transmission leakage signal.

18. The apparatus of claim 1, wherein the given value is the same as a sum of the value of the first transmission leakage signal and the value of the second transmission leakage signal, and wherein the phase shifter generates the phase control leakage signal having a phase opposite to the phase of the removing signal by adjusting at least one of the phase of the first transmission leakage signal and the phase of the second transmission leakage signal or by adjusting a phase of a sum of the first transmission leakage signal and the second transmission leakage signal.

19. A method of removing a transmission leakage signal, the method comprising:

generating a removing signal having a same size as a sum of a first transmission leakage signal leaked from a transmission signal and a second transmission leakage signal generated from reflection of the transmission signal at an antenna; and generating a phase control leakage signal having a phase different from a phase of the removing signal by adjusting at least one of a phase of the first transmission leakage signal and a phase of the second transmission leakage signal, or by adjusting a phase of a sum of the first transmission leakage signal and the second transmission leakage signal.

\* \* \* \* \*